United States Patent
Ito et al.

(10) Patent No.: US 7,760,841 B2
(45) Date of Patent: Jul. 20, 2010

(54) METHOD AND APPARATUS FOR EXECUTING AN OPERATION IN A PRESSURE VESSEL OF A NUCLEAR REACTOR

(75) Inventors: Tomoyuki Ito, Kanagawa-ken (JP); Mitsuaki Shimamura, Kanagawa-ken (JP); Motohiko Kimura, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/767,397

(22) Filed: Jan. 30, 2004

(65) Prior Publication Data

US 2010/0150299 A1 Jun. 17, 2010

(30) Foreign Application Priority Data

Jan. 31, 2003 (JP) .......................... P2003-024151

(51) Int. Cl.
*G21C 17/00* (2006.01)
*G21C 9/00* (2006.01)

(52) U.S. Cl. ....................... 376/249; 376/245; 376/260; 376/277

(58) Field of Classification Search ........................ None
See application file for complete search history.

(56) References Cited

U.S. PATENT DOCUMENTS

| 6,076,407 A | 6/2000 | Levesque et al. |
| 2002/0080905 A1 | 6/2002 | Paillaman et al. |
| 2003/0060685 A1* | 3/2003 | Houser et al. ............... 600/206 |
| 2003/0085301 A1* | 5/2003 | Ganoza et al. .............. 239/266 |

FOREIGN PATENT DOCUMENTS

| JP | 7-55985 | 3/1995 |
| JP | 7-55986 | 3/1995 |
| JP | 2001-159696 | 3/2001 |
| JP | 2001-141873 | 5/2001 |
| JP | 2001-281386 A | 10/2001 |
| JP | 2002-277582 | * 9/2002 |

* cited by examiner

*Primary Examiner*—Johannes P Mondt
(74) *Attorney, Agent, or Firm*—Pillsbury Winthrop Shaw Pittman, LLP (57) ABSTRACT

An operation method and apparatus in a pressure vessel of a nuclear reactor is provided. The operation apparatus including a body and a guide inserted from the upper side of the nuclear reactor to an interior of the jet pump. The operation apparatus circulate water inside the pressure vessel. The guide is positioned at the end of a body of the operation apparatus, and is inclined with respect to the center axis of the body so as to be inserted into a side opening of the jet pump.

6 Claims, 6 Drawing Sheets

METHOD AND APPARATUS FOR EXECUTING AN OPERATION IN A PRESSURE VESSEL OF A NUCLEAR REACTOR

CROSS REFERENCE TO RELATED APPLICATION

This application is based upon and claims the benefit of priority from the prior Japanese Patent Application No. 2003-24151 filed on Jan. 31, 2003, the entire contents of which are incorporated herein by reference.

BACKGROUND OF THE INVENTION

1. Field of the Invention

This invention relates to a working method and apparatus, which are capable of efficiently executing such an operation as inspection, examination operations or a preventive maintenance operation in a pressure vessel of a nuclear reactor in a boiling water nuclear reactor power plant.

2. Description of Related Art

In a related art nuclear reactor, a conventional working method in a pressure vessel is described in Japanese Patent Publication (Kokai) No. 2001-281386. This conventional method is that a working apparatus is moved to accessed a reactor bottom portion after removing a fuel and control rod driving mechanism, and passing the apparatus through a reactor core portion.

A conventional apparatus and method, which makes a working apparatus access the interior of a jet pump in a pressure vessel, are described in Japanese Patent Publication (Kokai) No. 2001-159696. This conventional apparatus includes a guide mechanism, which is inserted from an upper portion of the pressure vessel and is fixed to an inlet mixer of the jet pump. The guide mechanism is used since an upper opening of the jet pump is an opening from which the interior of the jet pump is hardly seen in a vertical direction. According to this conventional method, the working apparatus is inserted into and moved to access the interior of the jet pump smoothly by using the guide mechanism.

SUMMARY OF THE INVENTION

Accordingly an advantage of an aspect of the present invention is to provide method and apparatus for executing an operation in a pressure vessel of a nuclear reactor, which are capable of making the operation apparatus access the interior of a jet pump and a bottom portion of a nuclear reactor without removing fuel and control rods and a control rod driving mechanism, and without using a guide mechanism to the jet pump.

To achieve the above advantage, one aspect of the present invention is to provide a method for executing an operation in a pressure vessel of a nuclear reactor that comprises installing a body of an operation apparatus to the pressure vessel from the upper side of the nuclear reactor, the operation apparatus having a guide at an end of the body as it inclines with respect to an center axis of the body, inserting a guide into a side opening of a jet pump in the pressure vessel, and inserting the body to an interior of the jet pump as it follows the guide.

To achieve the above advantage, another aspect of the present invention is to provide a apparatus for executing an operation in a pressure vessel of a nuclear reactor that comprises a body inserted from the upper side of the nuclear reactor to an interior of the jet pump which circulate water inside the pressure vessel, having a guide at the end, the guide being inclined with respect to the center axis of the body so as to be inserted into a side opening of the jet pump.

To achieve the above advantage, another aspect of the present invention is to provide a apparatus for executing an operation in a pressure vessel of a nuclear reactor that comprises a body inserted from the upper side of the nuclear reactor to an interior of the jet pump which circulate water inside the pressure vessel, having a guide at the end, the guide having a surface being inclined with respect to an center axis of the body so as to be inserted into a side opening of the jet pump.

In accordance with the aspects of the present invention, method and apparatus for executing an operation in a pressure vessel of a nuclear reactor capable of making an operation apparatus access the interior of a jet pump and a bottom portion of a nuclear reactor without removing fuel rods, control rods and a control rod driving mechanism and without using a guide mechanism to the jet pump.

DETAILED DESCRIPTION OF A PREFERRED EMBODIMENT OF THE INVENTION

Figure 1:
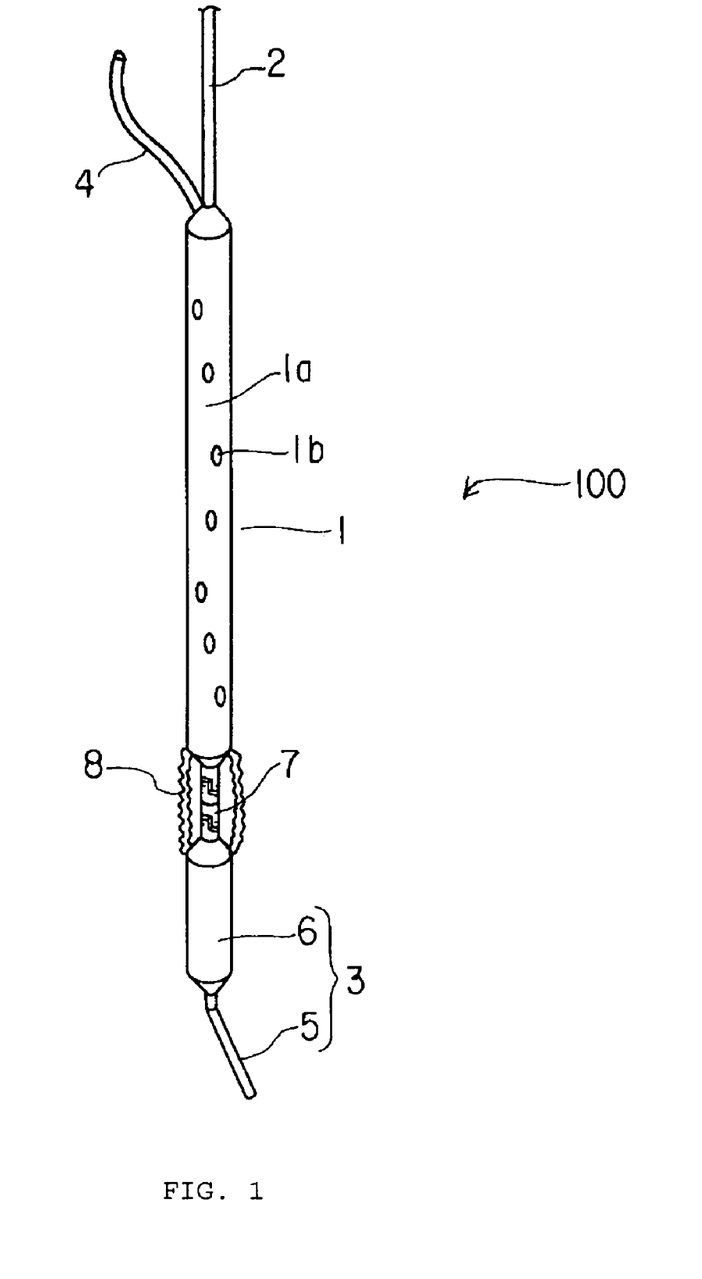
FIG. 1 is a perspective view of a first embodiment of an apparatus for executing an operation in a pressure vessel of a nuclear reactor in the present invention.

A first embodiment in accordance with the present invention will be explained with reference to FIG. 1 and FIG. 2. FIG. 1 is a perspective view showing the construction of the first embodiment of an operation apparatus.

Operation apparatus 100 includes a body 1, a wire rope 2 fixed to an upper end portion of body 1, and a guide 3 fixed to a lower end portion of body 1 and having sizes which permit the guide 3 to be inserted into a side opening of a jet pump. The side opening of the jet pump is provided between an inlet mixer and a nozzle. The jet pump is a pump, which circulate water inside a pressure vessel of a nuclear reactor.

Body 1 is made of an elongated tubular member 1a having a plurality of holes 1b in a circumferential wall. Body 1 is suspended by wire rope 2 using a hoist provided on an upper portion of a reactor (not shown). A hose 4 is connected to an end portion of an upper part of tubular member 1a. The water in a jet pump may be sucked through holes 1b formed in the circumferential wall of the tubular member 1a by a pump (not shown) connected to hose 4.

Guide 3 includes a guide rod 5 fixed to body 1 so that guide rod 5 inclines at a predetermined angle with respect to a vertical axis, which is a center axis of body 1. In other words, guide rod 5 has a inclined surface with its cylindrical part (rod). The inclined surface inclines with respect to a vertical axis. The angle of guide rod 5 may be determined in advance of the operation. A weight 6 is provided to exert gravitational force on the guide rod 5 so that the angle of the guide rod 5 does not vary greatly during the insertion of the guide rod 5 into the jet pump. Guide rod 5 is fixed to a lower portion of the weight 6. Guide 3 is freely movably supported at a lower portion of body 1 by a joint 7, such as a universal joint. Guide 3 is supported so that it can be able to vary an angle with respect to vertical axis of body 1. A circumferential portion of joint 7 is covered with bellows 8 made of an elastic member, such as a rubber member.

An operation of operation apparatus 100 as mentioned above will be described with reference to FIG. 2.

Figure 2:
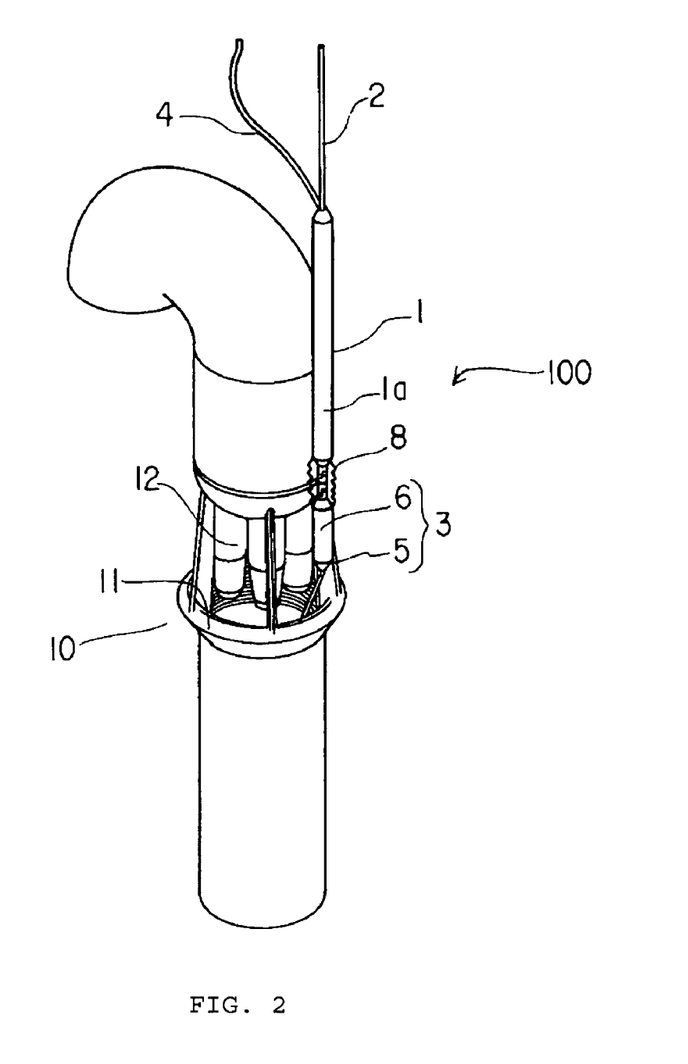
FIG. 2 is a perspective view of a first embodiment of a method for executing an operation in a pressure vessel of a nuclear reactor in the present invention, which shows the condition of a operation apparatus being inserted into the interior of a jet pump.

Body 1 is suspended by wire rope 2, and is lowered from an upper portion of a reactor to a position in the vicinity of a side opening existing between an inlet mixer 11 and a nozzle 12 of a jet pump 10 provided in the interior of the reactor and extending in a vertical direction, as shown in FIG. 2. A lower end of guide rod 5 of guide 3, which is connected to a lower portion of the body 1 is first inserted gradually into the inlet mixer 11 along a tapering surface of the side opening.

When body 1 is further suspended and lowered, body 1 is drawn due to the gravitational force of weight 6 of guide 3 which has already entered the interior of jet pump 10, as body 1 follows guide 3. Bellows 8, which covers joint 7, may have a function to restore guide 3 to a original position, since bellows 8 is made of an elastic member. Thus, guide 3 is biased to return to an appropriate position with respect to body 1. In this manner, body 1 is inserted into the interior of jet pump 10 substantially without varying the posture or the angle of operation apparatus 100 as a whole.

The amount of weight 6 and restoring force of bellows 8 may be determined suitably by the sizes and the dimensions of the side opening existing between an inlet mixer 11 and a nozzle 12 of a jet pump 10 shown in FIG. 2, such that body 1 and guide 3 can be smoothly inserted into the interior of jet pump 10. Thus, bellows 8 may be provided without restoring force. In this case, guide 3 is freely movably supported at a lower portion of body 1 by a joint 7. This enables guide 3 to vary its angle (posture) with respect to vertical axis of body 1, so that body 1 and guide 3 can also be inserted smoothly with suitable determination of the amount of weight 6.

In this embodiment, wire rope 2 is formed so that the amount of lowered movement of wire rope 2 lowered can be ascertained from an outer portion of the reactor.

When a pump (not shown) is operated with body 1 inserted to a predetermined position in the jet pump, the water in jet pump 10 is sucked through holes 1b in the circumferential wall of tubular member 1a and via hose 4 connected to the upper opened end of tubular member 1a. The resultant water is guided from an outlet of the pump to an analytical filter provided in the exterior of the reactor. A suitable quantity of contaminants and the like is recovered from the water by the analytical filter, and the water thus purified is returned to the core water.

When the operation finishes for recovering the contaminants and the like from water inside the interior of jet pump 10, body 1 is suspended and drawn up above the reactor by reversing the order of the steps of the operations mentioned above and executing the reversed operation, complete the whole operation.

The above-described mode of embodiment shows a case where the contaminants and the like in the interior of jet pump 10 are recovered. In order to inspect the interior of jet pump 10, a television camera, an eddy current probe and an array type ultrasonic probe are fixed to holes 1b made in the circumferential wall of tubular member 1a, and these machines necessary for the inspection operation are connected to a controller, which is provided in the exterior of the reactor, via signal cables instead of the hose connected to the upper opened end of tubular member 1a. This enables the inspection of the interior of jet pump 10 to be carried out practically with ease.

Body 1, in the embodiment, is made of tubular member 1a having a plurality of holes 1b in the circumferential wall of member 1a. Tubular member 1a may be provided with a position fixing mechanism with three pieces of arms, which are foldable and unfoldable around the axis of tubular member 1a and are arranged at regular intervals. Body 1 is inserted into jet pump 10 the position fixing mechanism set in a folded state, until body 1 reaches a predetermined position of jet pump 10. When body 1 reaches the predetermined position, the position fixing mechanism is unfolded so that the three pieces of arms touch the inner surface of jet pump 10. This enables body 1 to be positioned stably in jet pump 10.

The embodiment shows a case where body 1 is used for executing the removal of contaminants from water existing in the interior of jet pump 10, or for executing the inspection of the interior of jet pump 10. In order to inspect a bottom portion of a nuclear reactor, body 1 being inserted into the interior of jet pump 10 is further lowered in a suspended state by wire rope 2 to the bottom portion of the nuclear reactor through the lower opening existing in the bottom portion of jet pump 10. This enables carrying out the same inspection operation as mentioned above practically using a television camera, an eddy current probe, an array type ultrasonic probe or the like.

Thus, in the first embodiment of the present invention, operation apparatus 100, which includes body 1 and guide 3 with guide rod 5, is formed in such a size which permits operation apparatus 100 to be inserted into jet pump 10 from the side opening provided between inlet mixer 11 and nozzle 12. Guide rod 5 is fixed to the end portion of body 1 so that the end portion of guide rod 5 inclines at an appropriate angle with respect to vertical axis of body 1. Since guide rod 5 (and its surface) is inclined, body 1 can be inserted smoothly into jet pump 10 and be lowered to a predetermined position, without carrying out an operation for further moving guide 3 in the horizontal direction which is executed in a conventional working apparatus of this kind. Moreover, body 1 in the embodiment can also be inserted into a bottom portion of a nuclear reactor through the lower opening in the bottom portion of the jet pump 10.

Guide rod 5 is fixed to a lower portion of body 1 via weight 6. Therefore, when guide rod 5 is inserted into jet pump 10, the gravitational force is constantly exerted on body 1 due to the weight 6. This causes body 1 to be drawn into jet pump 10 as body 1 follows guide 3. Accordingly, the posture or the angle of operation apparatus 100 substantially as a whole does not vary greatly, so that body 1 can be inserted smoothly into jet pump 10 as body 1 is guided by guide rod 5 into the side opening existing between inlet mixer 11 and nozzle 12 of the jet pump 10.

Bellows 8 made of an elastic member is provided between a root portion of tubular member 1a and weight 6 so that the bellows cover the circumferential portion of the joint 7. Therefore, when body 1 of the working apparatus is inserted into the interior of the jet pump 10, the collision of the joint portion with the inlet mixer 11 and nozzle 12 may be prevented, which causes these parts to be damaged. Moreover, bellows 8 may have a function to restore guide 3 to a original state, in which guide rod 5 inclines at the appropriate angle with respect to the vertical axis of body 1 so that body 1 can be inserted more smoothly into jet pump 10.

Figures 3A, 3B:
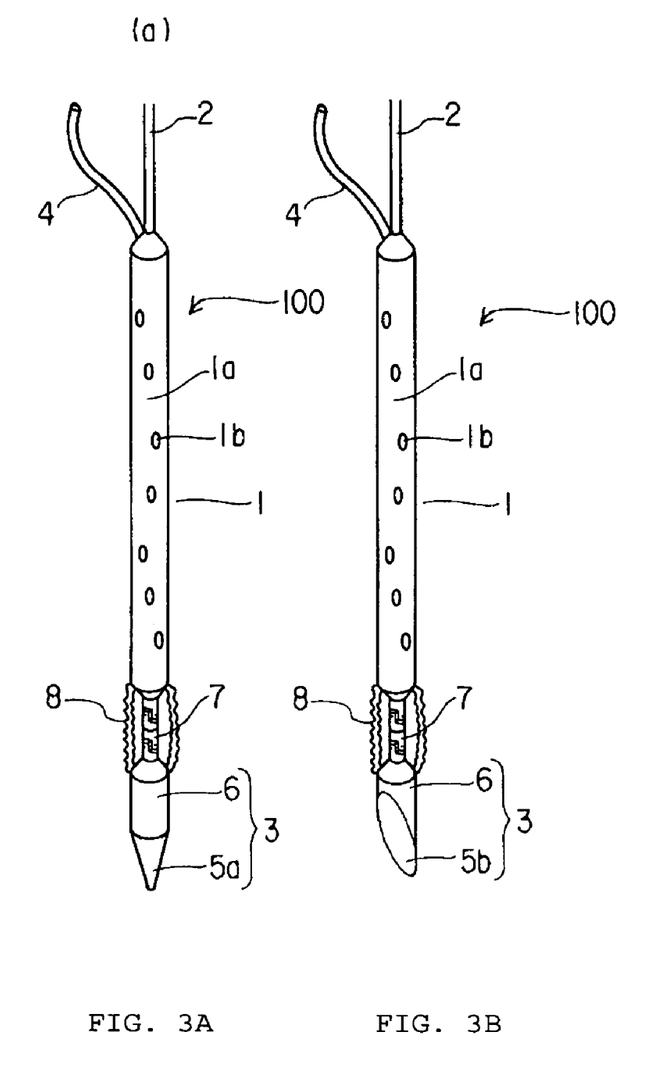
FIGS. 3A and 3B are a perspective view of a second embodiment of an apparatus for executing an operation in a pressure vessel of a nuclear reactor in the present invention.

A second embodiment of an operation apparatus in accordance with the present invention will be explained with reference to FIGS. 3A and 3B. FIGS. 3A and 3B is a perspective view showing the construction of a second embodiment of operation apparatus 100. In this embodiment, explanations of some elements in FIGS. 3A and 3B are omitted, since the same symbol is used for the same element described in the first embodiment referring to FIGS. 1 and 2.

This operation apparatus includes a body 1, a wire rope 2 fixed to an upper end portion of this body 1, and a guide 3 fixed to the end portion of body 1 and having sizes which permit the guide 3 to be inserted into a side opening of jet pump 10 which is provided between an inlet mixer and a nozzle, as described in the first embodiment.

As shown in FIGS. 3A and 3B, guide 3 includes a inclined surface 5a, 5b, whose inclined angle is predetermined appropriately with respect to a center axis of body 1 in the embodiment. Surfaces 5a, 5b are the substitute of guide rod 5 shown in FIG. 1 of the first embodiment. Surface 5a, 5b may be formed at a lower end portion of weight 6, as a surface of a cone shown in FIG. 3A, or as an elliptical surface being formed, when a column is cut by a plane as shown in FIG. 3B.

The operation of operation apparatus 100 as mentioned above is almost the same as what is described in the first embodiment. Body 1 is suspended by wire rope 2, and is lowered from an upper portion of a reactor to a position in the vicinity of a side opening existing between an inlet mixer 11 and a nozzle 12 of a jet pump 10, provided in the interior of the reactor and extending in a vertical direction as shown in FIG. 2 of the first embodiment. An end of surfaces 5a and 5b of guide 3 connected to a lower portion of the body 1 is first inserted gradually into the inlet mixer 11 along a tapering surface of the side opening.

When body 1 is further suspended and lowered, body 1 is drawn due to the gravitational force of weight 6 of guide 3 which has already entered the interior of jet pump 10, as body 1 follows guide 3. Bellows 8, which covers joint 7, may have a function to restore guide 3 to a original position, since bellows 8 is made of an elastic member. In this manner, body 1 is inserted into the interior of jet pump 10 substantially without varying the posture or the angle of operation apparatus 100 as a whole.

In the second embodiment of the present invention, operation apparatus 100, which includes body 1 and guide 3 with inclined surfaces 5a or 5b, is formed in such sizes that permit operation apparatus 100 to be inserted into the jet pump from the side opening provided between the inlet mixer and nozzle. Weight 6 is fixed to the end portion of body 1 so that surfaces 5a and 5b, which is the lower end portion of weight 6, inclines at an appropriate angle with respect to the vertical axis of body 1. Therefore, in the same manner as the first embodiment, body 1 can be inserted smoothly into the jet pump to a predetermined position without carrying out an operation for fixing a guide to the jet pump which is executed in a conventional working apparatus of this kind. Moreover, body 1, in the embodiment, can also be inserted into a bottom portion of a nuclear reactor through the lower opening being formed in the bottom portion of the jet pump.

Figure 4A:
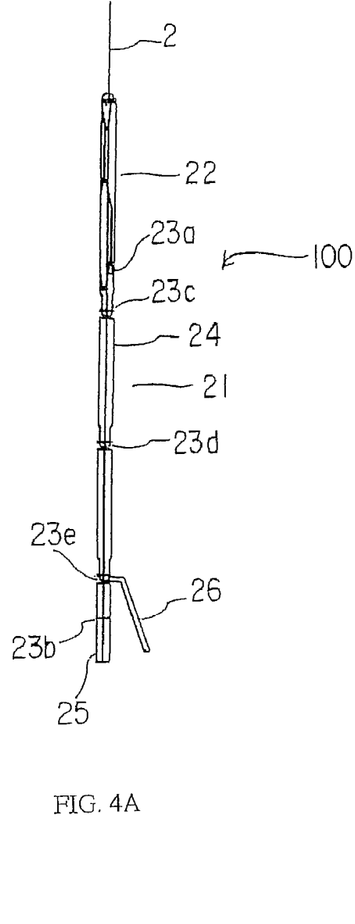
FIG. 4A is a front view of a third embodiment of an apparatus for executing an operation in a pressure vessel of a nuclear reactor in the present invention, which shows a fold-up supports folded in a body of an operation apparatus.
Figure 4B:
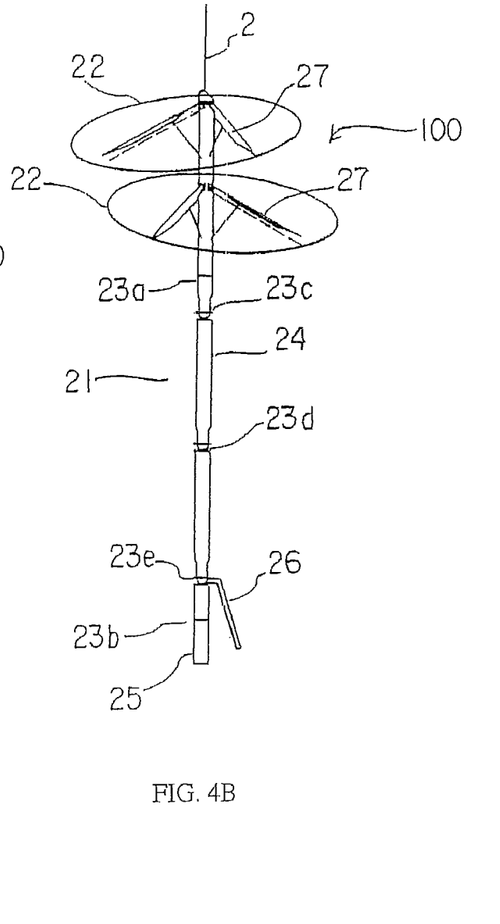
FIG. 4B is a front view of a third embodiment of an apparatus for executing an operation in a pressure vessel of a nuclear reactor in the present invention, which shows a fold-up supports unfolded from a body of an operation apparatus.

Third embodiment of an operation apparatus in accordance with the present invention will be explained with reference to FIG. 4A and FIG. 4B. FIGS. 4A and 4B are plain views showing the operation apparatus.

This operation apparatus includes a body 21, a wire rope 2 fixed to an upper end portion of this body 1, and a guide 26 fixed to the lower portion of body 21 and having sizes which permit the guide 26a to be inserted into a side opening of a jet pump which is provided between an inlet mixer and a nozzle.

A body 21 includes a position fixing mechanism 22, which is connected to and suspended by a wire rope 2. Body 21 additionally includes a link mechanism 24, which is connected coaxially to position fixing mechanism 22, and has around-axis rotational joints 23a, 23b at a root portion and a lower end portion of link mechanism 24. The around-axis rotational joints 23a, 23b are rotatable around the axis of body 21. Body 21 further includes three bending joints 23c, 23d, 23e, which are secured between these around-axis rotational joints 23a, 23b, and link mechanism 24 by which the rotational joints are connected together. A working tool 25, which is used for the operation to be executed in the pressure vessel, is connected to the around-axis rotational joint 23b at the lower end portion of link mechanism 24 and is connected to a guide 26 fixed to the bending joint 23e at the lower end portion of link mechanism 24. Therefore, the position of working tool 25 and guide 26 may be controlled by link mechanism 24. Consequently, working tool 25 and guide 26 are pivoted around center axis of the body 21, and are also adjusted their angle with respect to the vertical axis so that working tool 25 is positioned appropriately to execute the operation.

As the working tool 25, one of a television camera, an ultrasonic probe, a phased array UT head, an eddy current flaw detecting head, a laser irradiation head or a water injection nozzle is fixed exchangeably at the lower end portion of the link mechanism 24 of body 21.

The position fixing mechanism 22 at the root portion of the link mechanism 24 is provided with two sets of fold-up supports, which are spaced between each other in a vertical direction. Each of the sets has at least three fold-up supports 27, which are unfoldable from the axis of the body 21.

Body 21 is suspended by wire rope 2 using a hoist provided on an upper portion of a reactor, and is connected to a controller (not shown) which is provided outside the reactor via a cable, an optical fiber, a tube or the like.

The operation of operation apparatus 100 mentioned above will be described with reference to FIGS. 5A and 5B.

Figure 5A:
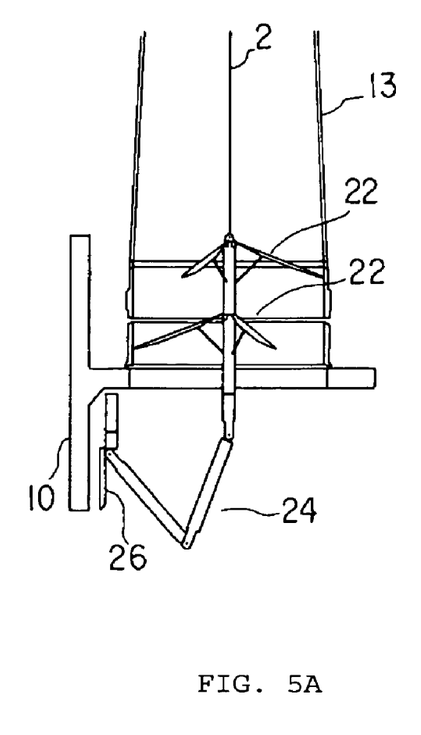
FIGS. 5A and 5B are a perspective view of a third embodiment of a method for executing an operation in a pressure vessel of a nuclear reactor in the present invention showing the operation apparatus being used in the interior of a jet pump.
Figure 5B:
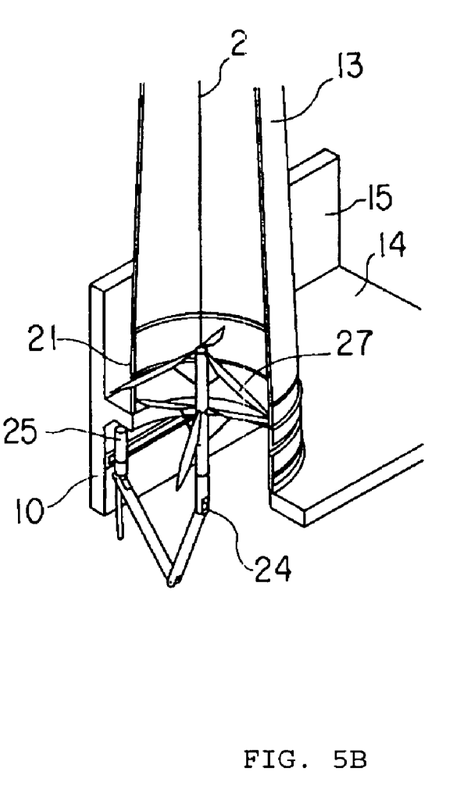

Working tool 25 is bent so that tool 25 is folded upward by bending joint 23e at the lower portion of link mechanism 24 with position fixing portion 22 in a folded state. Guide 26 is retained at the lower end portion of body 21 in an outwardly projecting (unfolded) state with a suitable angle with respect to a vertical axis of body 21.

When body 21, in this condition, is suspended by the wire rope 2 and lowered into the reactor by using the hoist provided on an upper portion of the reactor, body 21 is further lowered in a suspended state to a position in the vicinity of a side opening existing between the inlet mixer and nozzle of the jet pump in the same manner as in the first embodiment. The lower end of guide 26 connected to bending joint 23e of link mechanism 24 is inserted first gradually into the interior of the inlet mixer along a tapering surface of the side opening.

When it is ascertained that body 21, which is lowered in a suspended state reaches a predetermined position in the interior of jet pump 10, position fixing mechanism 22 provided at the root portion of body 21 is operated by the controller provided outside the reactor.

When this position fixing mechanism 22 is operated, two sets of three fold-up supports 27 are fixed, as shown in FIGS. 5A and 5B, to body 21 so that fold-up supports 27 are unfolded (extended) from the axis of body 21 in the outward direction. End portion of each of fold-up supports 27 touches and stabilized against the surface of the interior of jet pump 10. Thus, Fold-up supports 27 are fixed to and stabilized against an inner circumferential surface of a tubular diffuser 13. In this embodiment, body 21 is firmly held on the inner circumferential surface of diffuser 13 by three fold-up supports 27 of each of the sets, so that body 21 is positioned at the center of tubular diffuser 13. In jet pump 10, a reference numeral 14 denotes a baffle plate, and 15 shows a shroud.

When five rotational or bending joints 23a to 23e by which link mechanism 24 are connected together linearly are then driven, link mechanism 24 are turned in accordance with the angles of rotation of rotational joints 23a to 23e. Consequently, working tool 25 fixed to the lower end portion of link mechanism 24 is controlled and moved to a position of an object on which the operation executes in the interior of jet pump 10. Therefore, when one of working tools 25 including a camera, an ultrasonic probe, a phased array UT head, an eddy current flaw detecting head or a laser irradiation head is fixed to the working head, the inspection and repair of the interior of the jet pump 10 are executed. When these operations finish, body 21 is lifted in a suspended state to the upper portion of the reactor by reversing the order of the steps of the above-mentioned operation to complete the operations.

The above embodiment shows a case where the inspection and repair of the interior of jet pump 10 are carried out by body 21. When the inspection of a bottom portion of a nuclear reactor is carried out, body 21 inserted into the interior of the jet pump is further lowered in a suspended state by the wire rope 2 to the bottom portion of the nuclear reactor through the lower opening existing in the bottom portion of the jet pump 10. A television camera, an eddy current probe, an array type ultrasonic probe or the like may execute the inspection of the bottom portion of the nuclear reactor.

Thus, in the embodiment, body 21 is able to be inserted into the interior of jet pump 10 by merely fixing guide rod 26, which advances along a tapering surface of the side opening existing between the inlet mixer and nozzle of jet pump 10, to bending joint 23e at the lower end portion of link mechanism 24. Accordingly, without fixing a funnel-like guide apparatus to the inlet mixer portion of the jet pump as in the conventional art, the operation, such as inspection repair or modification of the interior of the jet pump can be carried out in a short period of time.

In body 21, the position fixing mechanism 22 having sets of unfoldable fold-up supports 27, each of which has three fold-up supports, are provided at the root portion. Therefore, the position fixing holding power to the diffuser 13 can be increased.

Under the position fixing mechanism 22, a link mechanism 24 formed by connecting links together linearly by rotational or bending joints 23a to 23e is provided, and a working tool 25 is detachably fixed to an end portion of the link mechanism 24. Therefore, it is possible that a working head, such as a camera or an ultrasonic probe access a required position in the interior of jet pump 10 easily.

When an operation is carried out in a bottom portion of a nuclear reactor, body 21 inserted in the interior of jet pump 10 from the side opening as a same manner. After inserted body 21 inside jet pump 10, body 21 is further lowered in a suspended state to the bottom portion of the reactor through the lower opening existing in the bottom portion of jet pump 10. As a result, an inspection operation may be executed by using a television camera, an eddy current probe, an array type ultrasonic probe or the like. Therefore, a fuel assembly, fuel support metal members, control rods and a control rod driving mechanism may not be removed unlike a conventional working apparatus. This enables the working hours to be greatly shortened.

Figure 6A:
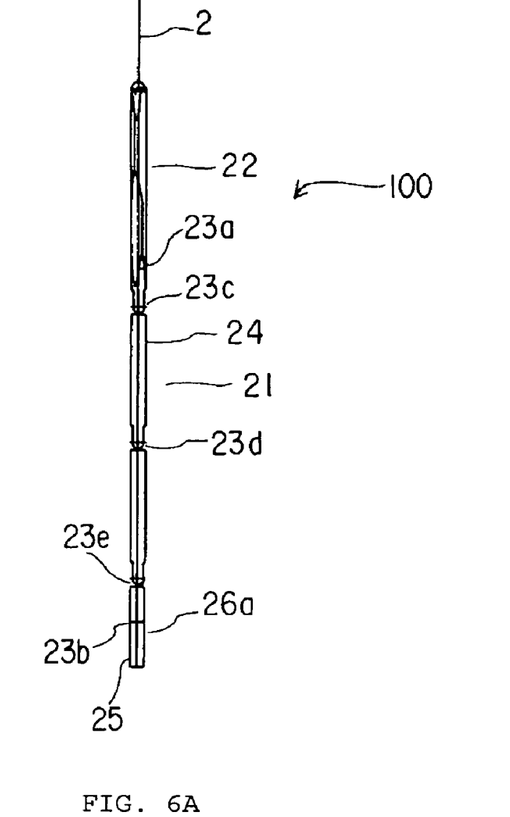
FIG. 6A is a front view of a fourth embodiment of an apparatus for executing an operation in a pressure vessel of a nuclear reactor in the present invention.
Figure 6B:
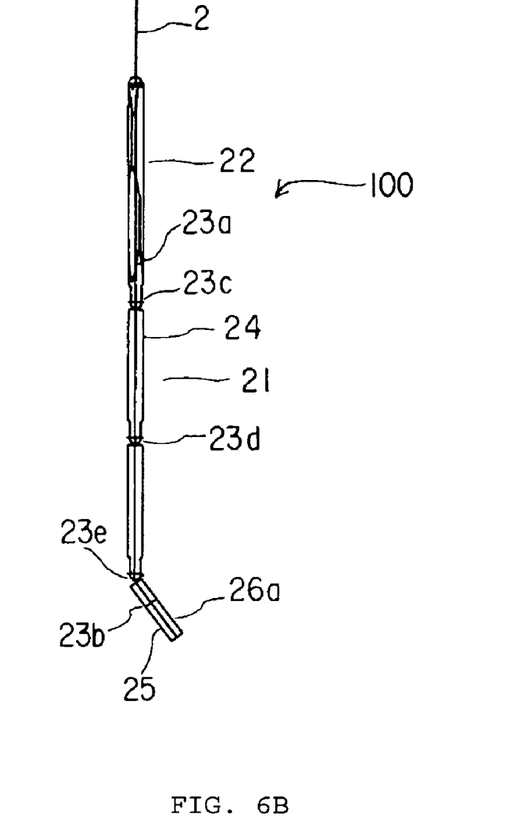
FIG. 6B is a front view of a fourth embodiment of an apparatus for executing an operation in a pressure vessel of a nuclear reactor in the present invention, which shows the condition of a operation apparatus being inserting into the interior of a jet pump.

A fourth embodiment of an operation apparatus in accordance with the present invention will be explained with reference to FIGS. 6A and 6B. FIGS. 6A and 6B are plain views showing the operation apparatus. In this embodiment explanations of some elements in FIGS. 6A and 6B are omitted, since the same symbol is used for the same element described in the third embodiment referring to FIGS. 4A and 4B.

This operation apparatus includes a body 21, a wire rope 2 fixed to an upper end portion of this body 1, and a guide 26a fixed to the end portion of body 21 and having sizes. The sizes is to permit the guide 26a to be inserted into a side opening of a jet pump which is provided between an inlet mixer and a nozzle, as described in the third embodiment.

Body 21 includes a position fixing mechanism 22 connected to and suspended by a wire rope 2. A link mechanism 24 is connected coaxially to this position fixing mechanism 22, and has around-axis rotational joints 23a, 23b at a root portion and a lower end portion of mechanism 24. Rotational joint 23a, 23b are rotatable around the axis of mechanism 24. Three bending joints 23c, 23d, 23e are provided between these around-axis rotational joints 23a, 23b, and links by which the rotational joints are connected together.

In this embodiment, a working tool 25, which is used for executing an operation in the pressure vessel and is connected to the around-axis rotational joint 23b at the lower end portion of link mechanism 24, commonly serves as a guide 26a. The position of working tool 25, which corresponds to that of guide 26a, may be controlled by link mechanism 24. Thus, guide 26a is a working tool 25 which controls its angle with respect to the center axis of body 21.

When operation apparatus 100 suspended by the wire rope 2 and lowered into the reactor by using the hoist provided on an upper portion of the reactor, body 21 is further lowered in a suspended state to a position in the vicinity of an opening existing between the inlet mixer and nozzle of the jet pump. The angle of working tool 25 is controlled and set to be able to be inserted into the side opening of the jet pump as guide 26a, as shown in FIG. 6B.

When body 21 is further suspended and lowered, body 21 is drawn due to the gravitational force of weight of guide 26a which has already entered the interior of the jet pump, as body 21 follows guide 26a, in the same manner as in the third embodiment. In this condition, bending joints 23c, and 23d, and 23e may be controlled to bend body 21 and working tool 25 so that body 21 can smoothly be inserted into the jet pump.

As described above, the fourth embodiment of the present invention, body 21 is rendered able to be inserted into the interior of the jet pump by working tool 25 as guide 26a, which advances along a tapering surface of the side opening existing between the inlet mixer and nozzle of the jet pump, to bending joint 23e at the lower end portion of link mechanism 24. Accordingly, in the same manner as the third embodiment, without fixing a funnel-like guide apparatus to the inlet mixer portion of the jet pump as in the conventional art, an operation, such as inspection of and repairs or modifications on the interior of the jet pump can be carried out in a short period of time. And it is possible that a working head, such as a camera or an ultrasonic probe accesses a required position in the interior of the jet pump easily in a same manner as described in the third embodiment.

Other embodiments of the present invention will be apparent to those skilled in the art from consideration of the specification and practice of the invention disclosed herein. It is intended that the specification and example embodiments be considered as exemplary only, with a true scope and spirit of the invention being indicated by the following.

What is claimed is:

1. An apparatus configured to perform a decontamination operation inside a jet pump of a nuclear reactor in which the jet pump includes an opening with a tapered surface, the apparatus comprising:
   an apparatus body having an elongated tubular member sized to be fully inserted down into the jet pump of the nuclear reactor, the tubular member having an upper portion that defines a top end of the apparatus body and is attached to a wire for support;
   the elongated tubular member having a circumferential wall with a plurality of holes, the plurality of holes being connected to a hose, the hose being connected to an open upper end of the elongated tubular member, the hose and the plurality of holes configured to guide core water from the jet pump to an analytical filter located outside the nuclear reactor;
   a weight for imparting gravitational force on the apparatus body, the weight having an upper portion that is coupled to a lower portion of the tubular member via a bellows;
   a guide rod abuttedly connected to a lower portion of the weight, the lower portion of the weight defining a bottom end of the apparatus body, the guide rod being elastically biased toward a predetermined, non-zero angle relative to a vertical axis of the apparatus body;
   wherein the biased, predetermined non-zero angle of the guide rod facilitates entry of the guide rod into the tapered surface of the jet pump opening and wherein, after the guide rod is inserted into the jet pump opening, the apparatus is lowered via the wire so that the apparatus body is essentially fully inserted into the jet pump to perform the decontamination operation.

2. The apparatus of claim 1, wherein the bellows comprises an elastic member coupling the lower portion of the tubular member to the upper portion of the weight.

3. The apparatus of claim 1, wherein the bellows is configured to impart a biasing force to restore the guide rod to the predetermined, non-zero angle relative to a vertical axis of the apparatus body.

4. An apparatus configured to perform an inspection operation inside a jet pump of a nuclear reactor in which the jet pump includes an opening with a tapered surface, the apparatus comprising:
   an apparatus body having an elongated tubular member sized to be essentially fully inserted down into the jet pump of the nuclear reactor, the tubular member having an upper portion that defines a top end of the apparatus body and is attached to a wire for support;
   the elongated tubular member having a circumferential wall with a plurality of holes;
   a plurality of signal cables connected to the elongated tubular member for connecting inspection means fixed to the plurality of holes to a controller exterior to the nuclear reactor;
   a weight for imparting gravitational force on the apparatus body, the weight having an upper portion that is coupled to a lower portion of the tubular member via a bellows;
   a guide rod abuttedly connected to a lower portion of the weight, the lower portion of the weight defining a bottom end of the apparatus body, the guide rod being elastically biased toward a predetermined, non-zero angle relative to a vertical axis of the apparatus body;
   wherein the biased, predetermined non-zero angle of the guide rod facilitates entry of the guide rod into the tapered surface of the jet pump opening and wherein, after the guide rod is inserted into the jet pump opening, the apparatus body is lowered via the wire so that the apparatus body is essentially fully inserted into the jet pump to perform the inspection operation.

5. The apparatus of claim 4, wherein the bellows comprises an elastic member coupling the lower portion of the tubular member to the upper portion of the weight.

6. The apparatus of claim 4, wherein the bellows is configured to impart a biasing force to restore the guide rod to the predetermined, non-zero angle relative to a vertical axis of the apparatus body.

* * * * *